(12) United States Patent
Neven et al.

(10) Patent No.: US 7,730,780 B2
(45) Date of Patent: Jun. 8, 2010

(54) LEVEL SWITCH AND METHOD FOR DETECTING THE FILL LEVEL OF A MEDIUM IN A CONTAINER

(75) Inventors: Jef Neven, Mours (FR); Vincent Pichot, L'Albene (FR)

(73) Assignee: Krohne S.A., Romans-Cedex (FR)

( * ) Notice: Subject to any disclaimer, the term of this patent is extended or adjusted under 35 U.S.C. 154(b) by 196 days.

(21) Appl. No.: 12/029,775

(22) Filed: Feb. 12, 2008

(65) Prior Publication Data
US 2008/0190194 A1 Aug. 14, 2008

(30) Foreign Application Priority Data
Feb. 12, 2007 (DE) ........................ 10 2007 007 407

(51) Int. Cl.
*G01F 23/26* (2006.01)
(52) U.S. Cl. .................................................. 73/304 R
(58) Field of Classification Search ............... 73/304 R
See application file for complete search history.

(56) References Cited
U.S. PATENT DOCUMENTS 3,530,711 A * 9/1970 Tocanne ................... 73/152.23
5,982,645 A * 11/1999 Levran et al. ................ 363/37
7,581,437 B2 * 9/2009 Colby et al. ............... 73/61.71

\* cited by examiner

*Primary Examiner*—Hezron Williams
*Assistant Examiner*—Rodney T Frank
(74) *Attorney, Agent, or Firm*—Cesari and McKenna, LLP

(57) ABSTRACT

A level switch detects the fill level of a medium in a container and transmits a switch signal corresponding to the detected level. The level switch incorporates a signal generator for generating an electromagnetic signal, a measuring circuit, and a reference circuit into which the electromagnetic signal can be fed. The measuring circuit is so configured and positioned that the signal fed into the measuring circuit changes as a function of whether or not the measuring circuit is surrounded by the medium, while the reference circuit is so configured and positioned that the signal fed into the reference circuit remains unaffected by the fill level of the medium. A tap at a specific point on the measuring circuit collects the measuring voltage, a tap at a specific point on the reference circuit collects a reference voltage, and a voltage comparator compares the measuring voltage with the reference voltage and emits a comparison-derived switch signal. This permits the dependable detection of a specific level of the medium in the container while essentially eliminating errors due to changes in extraneous parameters such as temperature fluctuations. A method for detecting the fill level of a medium in a container employing the switch is also disclosed.

20 Claims, 2 Drawing Sheets

LEVEL SWITCH AND METHOD FOR DETECTING THE FILL LEVEL OF A MEDIUM IN A CONTAINER

BACKGROUND OF THE INVENTION

The invention relates to a level switch employed for detecting the fill level of a medium in a container and for transmitting a switch signal corresponding to the detected level, as well as to a method for detecting the level of a medium in a container and for transmitting a switch signal corresponding to that level.

Level switches of this type have been widely used in practical applications and generally serve as limit detectors for determining whether the medium in the container is above or below a predefined level. These level switches are employed in a wide variety of industrial applications including virtually all aspects of process engineering. While they are frequently used for liquids, they are equally suitable for applications involving pasty and granular materials. Typical liquid applications include spillage and dry-run prevention.

Prior art has described various types of level switches such as vibrating level switches and capacitive level switches. One problem often encountered in practical applications, however, has been that the switch signal, intended to indicate the level of the medium in the container, changes even though the medium has not reached the level at which the switch signal is supposed to change. That problem is often caused by varying extraneous conditions such as temperature fluctuations.

SUMMARY OF THE INVENTION

It is the objective of this invention to introduce a level switch and a method for detecting the fill level of a medium in a container as well as for transmitting a switch signal representative of the fill level whereby the detection of the fill level is possible and largely unaffected by extraneous parameters such as temperatures.

For a level switch of the type described above, this objective is achieved in that the level switch is provided with a signal generator for generating an electromagnetic signal as well as a measuring circuit and a reference circuit into each of which an electromagnetic signal generated by the signal generator can be fed, with the measuring circuit designed and positioned in such fashion that the signal fed into it varies as a function of whether or not the measuring circuit is surrounded by the medium, while the reference circuit is designed and positioned in a way that the signal fed into the reference circuit is independent of the fill level of the medium, and at a specific point the measuring circuit is provided with a measuring-voltage tap permitting the determination of the measuring voltage while at a specific point the reference circuit is provided with a reference-voltage tap permitting the determination of the reference voltage, and a voltage comparator is provided for comparing the measuring voltage with the reference voltage and for transmitting a comparison-dependent switch signal.

This invention thus introduces a level switch in which an electromagnetic signal fed into a measuring circuit is compared with an electromagnetic signal fed into a reference circuit, whereby the effect of extraneous parameters such as temperature drift constituting a source of errors in level status detection is eliminated to the largest extent possible. The level status of the medium to be detected consists in the determination of whether the medium in the container is below or above a predefined level. This determination is a function of the interaction between the electromagnetic signal fed into the measuring circuit and the surrounding material. Therefore, according to the invention, the measuring circuit is designed and positioned in a way whereby the electromagnetic signal fed into the measuring circuit varies depending on its surroundings. When the measuring circuit is surrounded by the medium, the signal will differ from that in a situation where no medium is present, i.e. when the medium has not yet reached up to the measuring circuit.

It is thus possible to differentiate between two fill-level conditions, one representing the "measuring circuit reached", the other the "measuring circuit not yet reached" status. In other words, the switch signal transmitted by the level switch according to the invention will change the moment the medium reaches the end of the measuring circuit. This works both ways, i.e. whether the level of the medium rises from below and makes initial contact with the measuring circuit so as to interact with the latter in the manner provided for by this invention, or whether in the case of a receding medium its level drops below the end of the measuring circuit with a corresponding interruption of any interaction.

In essence, the electromagnetic signals that can be fed into the measuring circuit and into the reference circuit may vary in nature. For example, even electromagnetic signals with varying frequencies may be used. However, in a preferred embodiment of the invention, the electromagnetic signal emitted by the signal generator is a high-frequency signal of a specific frequency.

It would be possible to feed different electromagnetic signals into the measuring circuit and reference circuit. In a preferred embodiment of the invention, however, the same signal is in each case fed into the measuring circuit and reference circuit via a signal coupling device.

The measuring circuit could conceivably be configured and positioned outside the container while still permitting an interaction between the medium and the signal fed into the measuring circuit for determining the fill level concerned. In a preferred embodiment of the invention, however, the measuring circuit is installed inside the container. As indicated above, the switching point, i.e. the level of the medium at which the switch signal changes, can be defined by the end of the measuring circuit.

To avoid any interaction between the medium and the reference circuit, the latter could be positioned outside the container. However, in a preferred implementation of the invention both the measuring circuit and the reference circuit are housed in one common tubular probe that is inserted in the container. A dielectric tubular probe is particularly preferred.

In order for the measuring circuit to be able to interact with its surroundings as defined in this invention, while the reference circuit is prevented from any such interaction, a preferred embodiment of the invention has the measuring circuit positioned in the outer region of the dielectric tubular probe while the reference circuit is situated in the inner region of the dielectric tubular probe.

For this configuration in particular but for other measuring circuit and reference circuit assemblies as well, a preferred embodiment of the invention employs a dual-conductor measuring-circuit as well as reference-circuit design. The voltage tap is preferably implemented between the conductors of the conductor pair. When the two conductors of the measuring circuit are situated in the outer region of the tubular probe, the electromagnetic signal fed into the measuring circuit will make it possible for at least part of the electromagnetic flux lines to extend outside the tubular probe, allowing the surroundings of the tubular probe to have an effect on the electromagnetic signal that has been fed into the measuring circuit. The important aspect in this case is the capacitive effect due to the changing dielectric constant depending on whether or not the medium already surrounds the tubular probe. If, as described above, the dual-conductor reference circuit is located in the inner region of the dielectric tubular probe, it is possible to have the lines of electric flux extend in practically their entirety within the tubular probe, so that regardless of the level of the medium there will be no change in the dielectric constant of the surroundings "sensed" by the reference circuit.

In a preferred embodiment of the invention employing a dual-conductor measuring circuit, one end of the conductor pair is open. Thus, given that feeding a high-frequency signal into the measuring circuit and into the reference circuit generates a stationary wave in each case, it is possible to detect the attainment of the end of the measuring circuit by the medium by virtue of a change from "open end" to "closed end" and, consequently, an associated signal change. In specific terms, this means that at the moment at which the medium reaches the end of the measuring circuit, the latter is virtually extended, causing the stationary wave to shift. This, in turn, entails a change of the measuring voltage collected at the tap between the two conductors, whereby the switching point of the level switch is detected via a change in the difference between the measured voltage and the reference voltage. Significantly, temperature fluctuations cannot as such be interpreted in the measuring voltage as the detection of the switching point in view of the fact that corresponding temperature fluctuations also relate to the reference circuit and thus to the reference voltage collected in the latter.

The above description mentions only one measuring circuit and one reference circuit. It is possible, of course, to provide several measuring circuits whereby, given an appropriate geometric layout, a plurality of switching points can be defined for different specific fill levels of the medium in the container. In essence, each measuring circuit could have its own reference circuit assigned to it. However, in a preferred embodiment of the invention, the plurality of measuring circuits can be adequately served by one single reference circuit.

With regard to the method first described above for detecting the fill level of a medium in a container and for transmitting a switching signal representative of that level, the stated objective is achieved in that an electromagnetic signal is fed into a measuring circuit and, respectively, into a reference circuit, the measuring circuit is configured and positioned in a manner whereby the signal that has been fed into the measuring circuit changes as a function of whether or not the measuring circuit is surrounded by the medium, and the reference circuit is configured and positioned in a manner whereby the signal fed into the reference circuit remains unaffected by the fill level of the medium, a measuring voltage is collected at a specific tap on the measuring circuit, a reference voltage is collected at a specific tap on the reference circuit, the measuring voltage is compared with the reference voltage and a comparison-dependent switching signal is emitted.

Preferred versions of the inventive method are derived in analogous adaptation to the above-described preferred embodiments of the level switch according to the invention.

The following description of two preferred embodiments will explain this invention in more detail with reference to the attached drawings.

DESCRIPTION OF THE PREFERRED EMBODIMENTS

Figure 1:
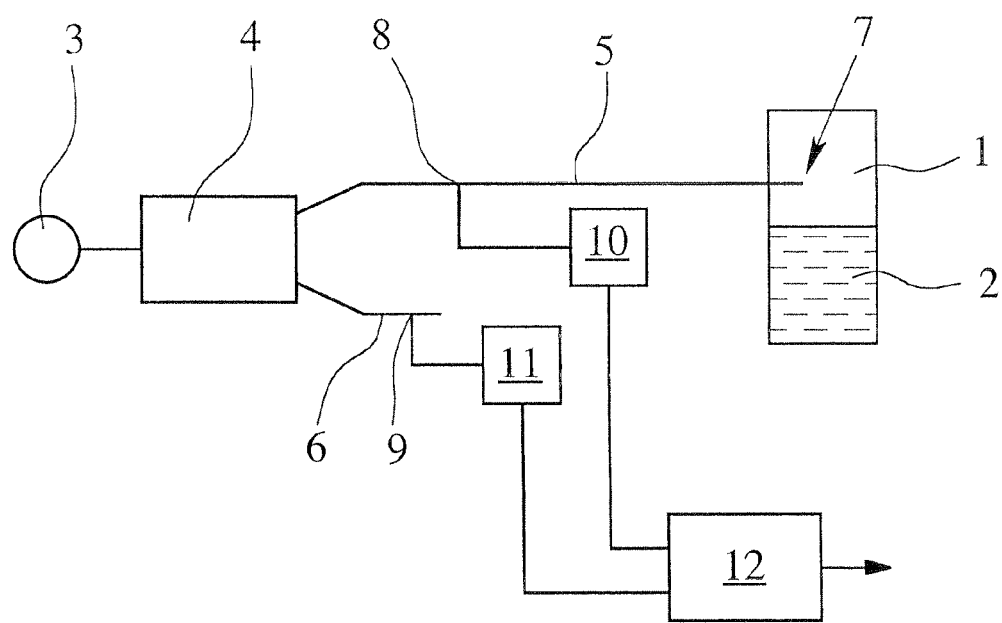
FIG. 1 is a schematic illustration of a level switch according to a first preferred embodiment of the invention.

FIG. 1 is a schematic diagram of a level switch according to a first preferred embodiment of the invention, serving to detect the level of a medium 2 in a container 1 and to transmit a switching signal representative of that level. To that effect, the level switch incorporates a signal generator 3 for generating an electromagnetic signal. By means of a signal coupling device 4, the electromagnetic signal is fed into a measuring circuit 5 and a reference circuit 6. The measuring circuit 5 is inserted in the container 1, its end 7 terminating at a specific level in the container 1, while the reference circuit 6 is entirely positioned outside the container 1. In this fashion, as provided for by the invention, the measuring circuit 5 is caused to interact with the medium 2 in the container 1 the moment that the medium reaches the said specific level, whereas any similar interaction between the reference circuit 6 and the medium 2 is virtually eliminated.

At a specific point on the measuring circuit 5 and, respectively, on the reference circuit 6, the measuring voltage is collected at tap 8 and the reference voltage at tap 9, with corresponding voltage signals conducted, via a measuring voltage detector 10 and, respectively, a reference voltage detector 11, to a voltage comparator 12. As a function of the comparison of these two voltages, the voltage comparator will emit a switching signal which switching signal will undergo a specific change the moment the medium 2 in the container 1 reaches the end 7 of the measuring circuit 5.

In the above-described first preferred embodiment of the invention, both the measuring circuit 5 and the reference circuit 6 are each configured as a dual-conductor system, each with two mutually parallel conductors. The measuring circuit 5 is in the form of a conductor pair with an open end 7, as a result of which, when the medium 2 in the container 1 makes contact with it, the "open end" state will switch to a "closed end" state, in turn leading to a change in the measuring voltage collected at the tap 8 between the two conductors. Since both the measuring circuit 5 and the reference circuit 6 are exposed to essentially identical temperature conditions, only those changes in the measuring voltage are interpreted as a switching signal which are actually attributable to an interaction with the medium 2 in the container 1 rather than necessarily to changes in other extraneous parameters such as temperature fluctuations.

Figures 2A, 2B:
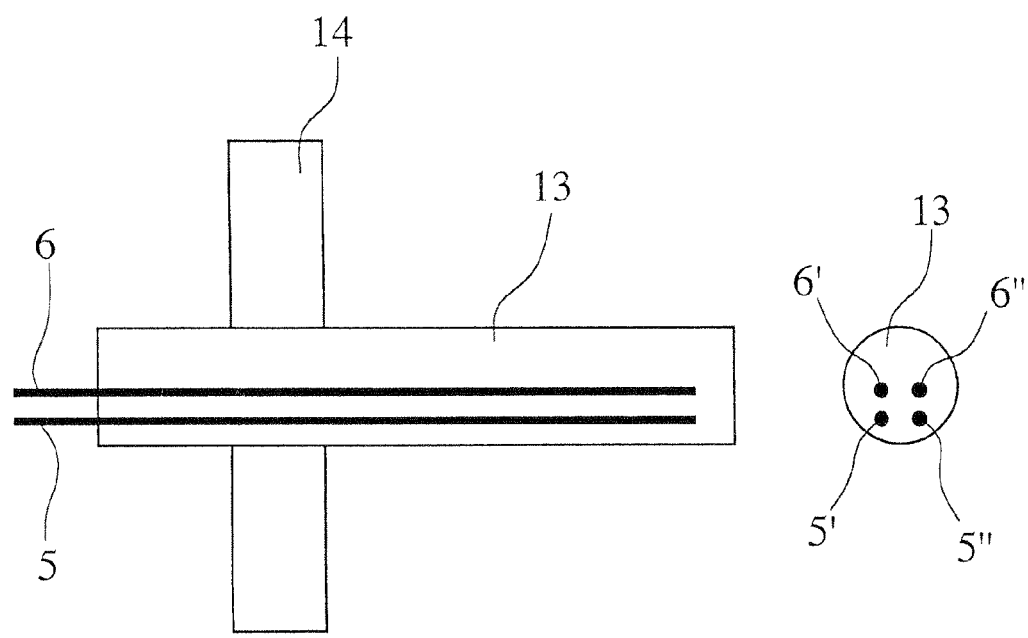
FIGS. 2a and 2b are schematic representations of the tubular probe of a level switch according to a second preferred embodiment of the invention.

FIGS. 2a and 2b show a tubular probe 13 in a level switch, not illustrated, according to a second preferred invention embodiment. FIG. 2a is a schematic longitudinal sectional view of the tubular probe 13, while FIG. 2b is a cross sectional view of the tubular probe 13.

The tubular probe 13 features a flange 14, permitting insertion in the container 1 (FIG. 1) and attachment to a corresponding counter-flange, not illustrated. The illustrated tubular probe 13 consists of a dielectric material such as PTFE and houses both the measuring circuit 5 and the reference circuit 6. These, as shown in particular in FIG. 2b, are dual-conductor systems with two mutually parallel conductors 5', 5" or, respectively, 6', 6". The measuring circuit 5 is positioned in the outer region of the tubular probe 13 while the reference circuit 6 is positioned in the central region of the tubular probe 13. It follows that, as is again evident from FIG. 2b, the lines of flux between the conductors 5', 5" of the measuring circuit 5 also run outside the tubular probe 13 while the lines of flux between the conductors 6', 6" of the reference circuit 6 essentially extend within the tubular probe 13 only. Accordingly, the reference circuit 6 "senses" practically nothing outside the tubular probe 13, and only the electromagnetic signal that has been fed into the measuring circuit 5 will react to the presence or absence of the medium 2 outside the tubular probe 13.

This is basically identical to the operating mode of the level switch according to the first preferred embodiment of the invention. The difference, however, is that the measuring circuit 5 and the reference circuit 6 are positioned within close mutual physical proximity, so that temperature variations between the measuring circuit 5 and the reference circuit 6 are more or less completely eliminated. In the event of temperature fluctuations, the measuring voltage collected between the conductors 5', 5" would change to the same extent as the reference voltage collected between the conductors 6', 6", thus essentially eliminating switching-point detection errors.

Enhanced sensitivity of the above-described measuring technique at the voltage tap may be obtained by selecting for the measuring voltage detector 10 and, respectively, the reference voltage detector 11 a logarithmic detector with a dynamic range on the order of 60 to 80 dB.

The invention claimed is:

1. A level switch for detecting the fill level of a medium in a container and for transmitting a switch signal representative of that level, incorporating a signal generator for generating at least one electromagnetic signal, a measuring circuit as well as a reference circuit into each of which an electromagnetic signal generated by the signal generator can be fed, said measuring circuit being so configured and positioned that the electromagnetic signal fed into the measuring circuit undergoes a change that depends on whether or not the measuring circuit is surrounded by the medium, while the reference circuit is so configured and positioned that the electromagnetic signal fed into the reference circuit remains unaffected by the level of the medium, with a measuring-voltage tap at a specific point on the measuring circuit permitting the determination of the measuring voltage and a reference voltage tap at a specific point on the reference circuit permitting the determination of the reference voltage, and with a voltage comparator serving to compare the measuring voltage with the reference voltage and to emit a comparison-derived switch signal.

2. The level switch as in claim 1, wherein said at least one signal generated by the signal generator consists of at least one high-frequency signal of a specific predefined frequency.

3. The level switch as in claim 1 or 2, including a signal coupling device for feeding the same signal from the signal generator into the measuring circuit and the reference circuit.

4. The level switch as in claim 1 or 2, wherein the measuring circuit is inserted in the container.

5. The level switch as in claim 4, wherein the measuring circuit and the reference circuit are both located in a tubular probe that is inserted in the container.

6. The level switch as in claim 5, wherein said tubular probe is of a dielectric material.

7. The level switch as in claim 5, wherein the measuring circuit is positioned in an outer region of the tubular probe and the reference circuit is positioned in an inner region of the tubular probe.

8. The level switch as in claims 1 or 2, wherein the measuring circuit and/or the reference circuit are/is each configured as a dual-conductor system.

9. The level switch as in claim 8, wherein the measuring circuit has an open end.

10. The level switch as in claim 1 or 2, and further including at least one additional measuring circuit, all said measuring circuits being in combination with said reference circuit.

11. A method for detecting the fill level of a medium in a container and for emitting a switch signal that is representative of that level, for which an electromagnetic signal is fed into a measuring circuit and, respectively, into a reference circuit, said measuring circuit is so configured and positioned that the signal fed into the measuring circuit changes as a function of whether or not the measuring circuit is surrounded by the medium, said reference circuit is so configured and positioned that the signal fed into the reference circuit remains unaffected by the fill level of the medium, a measuring voltage is collected at a specific point on the measuring circuit, and a reference voltage is collected at a specific point on the reference circuit, the measuring voltage and the reference voltage are compared and a comparison-derived switch signal is emitted.

12. The method as in claim 11, including employing for the electromagnetic signal a high-frequency signal of a specific frequency.

13. The method as in claim 11 or 12, including feeding the same signal into the measuring circuit and, respectively, into the reference circuit.

14. The method as in claim 11 or 12, including inserting a measuring circuit in the container.

15. The method as in claim 14, including housing the measuring circuit and the reference circuit in a tubular probe that is inserted in the container.

16. The method as in claim 15, including forming the tubular probe of a dielectric material.

17. The method as in claim 15, including positioning the measuring circuit in an outer region of the tubular probe and positioning the reference circuit in an inner region of the tubular probe.

18. The method as in claim 11 or 12, including configuring the measuring circuit and/or the reference circuit as a dual-conductor system.

19. The method as in claim 18, including forming the measuring circuit with an open end.

20. The method as in claim 11 or 12, including providing at least one additional measuring circuit, all of the measuring circuits being in combination with said reference circuit.

* * * * *